United States Patent [19]

Norman

[11] 4,183,336
[45] Jan. 15, 1980

[54] FUEL-AIR CONTROL DEVICE

[75] Inventor: Juanita Norman, Westlake Village, Calif.

[73] Assignee: Ecotroleum, Inc., Cincinnati, Ohio

[21] Appl. No.: 861,902

[22] Filed: Dec. 19, 1977

[51] Int. Cl.² ............................................. F02M 25/06
[52] U.S. Cl. .............................. 123/119 B; 123/124 B; 123/106
[58] Field of Search ........... 123/124 B, 124 A, 124 R, 123/119 B, 106, 162

[56] References Cited

U.S. PATENT DOCUMENTS

| | | | |
|---|---|---|---|
| 1,813,719 | 7/1931 | White | 123/124 B |
| 2,035,237 | 3/1936 | Kushinsky | 123/124 B |
| 2,386,340 | 10/1945 | Olson | 123/124 B |
| 2,886,020 | 5/1959 | Wolfe | 123/124 B |
| 3,043,286 | 7/1962 | Blomberg | 123/124 B |
| 3,787,037 | 1/1974 | Motooka | 123/124 A |
| 3,923,024 | 12/1975 | Dabrio | 123/119 B |
| 4,094,292 | 6/1978 | Takagi | 123/124 A |

FOREIGN PATENT DOCUMENTS 685366   1/1953   United Kingdom ................. 123/124 B Primary Examiner—Wendell E. Burns

[57] ABSTRACT

The invention concerns a device for controlling the vehicles fuel-air mixture by regulating the air in the ventilation passage leading to the engine air intake from the crankcase. In a vehicle provided with a PCV valve, the device is located in the ventilation passage leading from the crankcase to the engine air intake and the device is downstream of the PCV valve. The device admits outside air to the ventilation passage to lean the gas mixture when the engine is operating at normal highway speeds or under load conditions and shuts off this flow of outside air as when the engine is running at low speeds or idling when the gas mixture need not be leaned.

12 Claims, 8 Drawing Figures

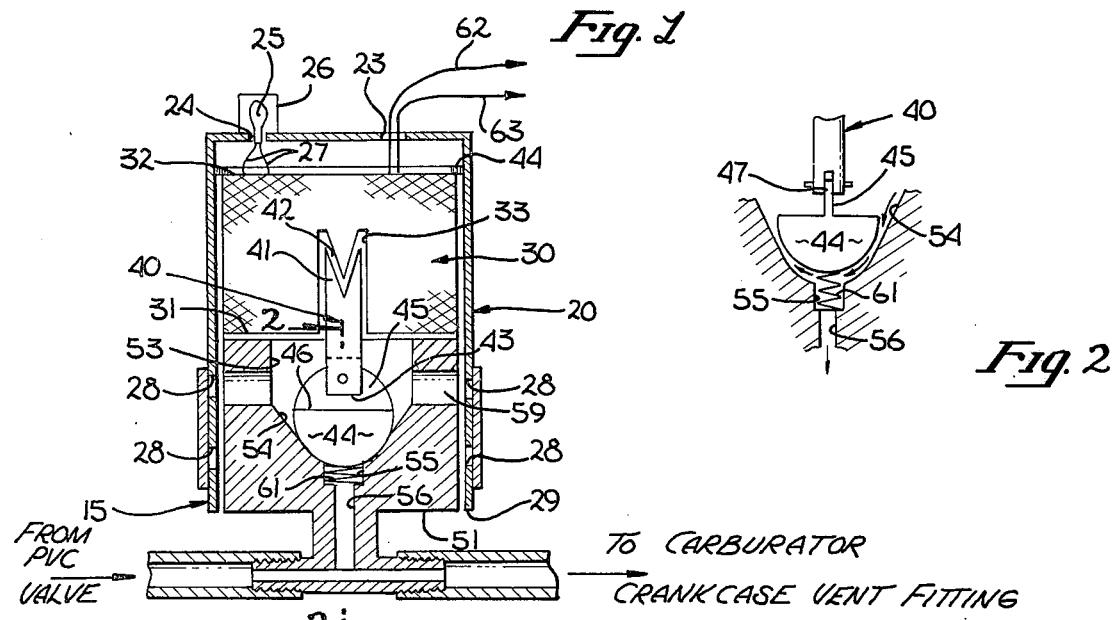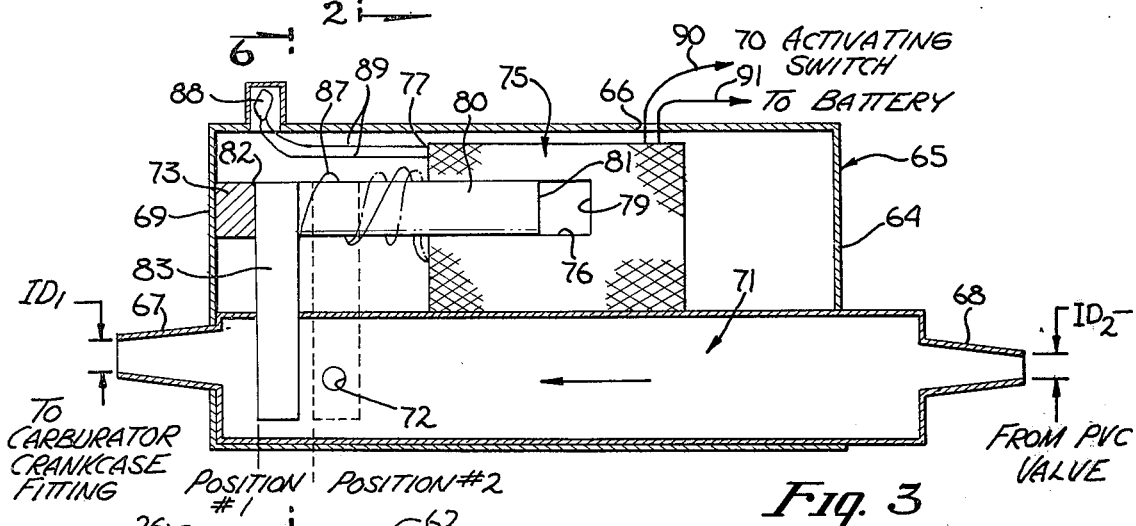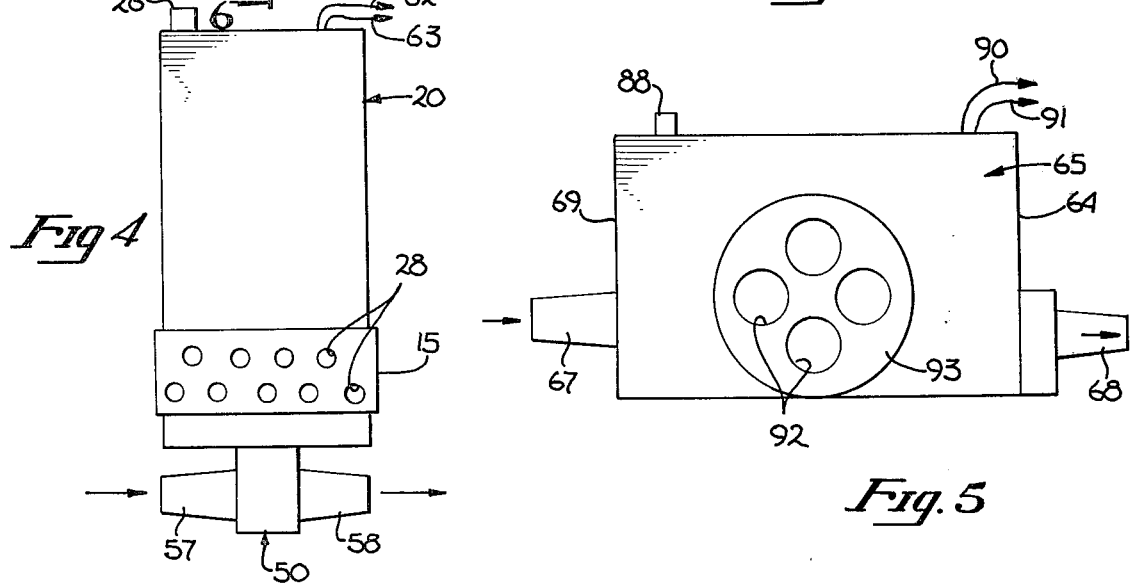

FUEL-AIR CONTROL DEVICE

BACKGROUND OF THE INVENTION

1. Field of the Invention

This invention relates to devices used in vehicular internal combustion engines and specifically, to efficient control and use of crankcase fumes.

2. Prior Art

Automobile engines contribute to atmospheric pollution by spewing forth unburned or partially burned gaseous hydrocarbons and even droplets of unburned oil. A principal offender in this respect are the fumes which originate in the crankcase and which in the past, were allowed to escape to the atmosphere. In recent years, laws have been passed which require the fumes to be channeled back to the air intake manifold of the engine, there to be mixed with the incoming fuel-air mixture so that the unburned hydrocarbons in the fumes will be burned in the engine cylinders.

In existing automobile engines, a crankcase ventilation conduit has its intake end usually located upstream of the carburetor in such manner as to pass fresh air into the crankcase. Ventilation of the crankcase is achieved by drawing off this air and entrained fumes, gases, etc., through a conduit connected to the downstream side of the carburetor or to the air intake manifold.

The crankcase fumes and ventilating air pass into the induction system downstream of the carburetor. Because of this, the flow from the crankcase to the intake manifold must be controlled. To provide such control, a pollution control valve, or positive crankcase ventilation valve (PCV valve) is located in the conduit connecting the crankcase to the engine air intake manifold. The PCV valve closes during engine idling when the vacuum in the intake manifold is high. When the PCV valve is closed, the ventilating air and fumes either are blocked off entirely or only small amounts are allowed to pass through an orifice in the PCV valve member.

As the engine speeds up, the PCV valve opens to permit larger quantities of air and crankcase fumes to be drawn into the intake manifold, thus increasing the ventilation effect in the crankcase. The PCV valve operates in a puttering manner, rather than smoothly fully opening and closing. While PCV valves are quite effective in obtaining less ventilation when the engine is idling and more ventilation when the engine is speeded up, the minimal flow through the PCV valve during idling adversely affects engine idling and increases gasoline consumption. The design of the PCV valve is a compromise between good idling and effective burning of the crankcase fumes.

In engines which are not provided with a PCV valve, it is still desirable to increase the air flow into the intake manifold downstream of the carburetor, except when the vehicle is idling and the intake manifold vacuum is high. An additional supply of air reduces the amount of vaporized fuel that is drawn through the carburetor and that would be wasted in the vehicle exhaust and would pollute the environment. The richness of the fuel air mixture is preferably reduced. A more correct air to fuel ration is assured.

In a vehicle having a PCV valve, the device of the present invention is designed for being positioned in the conduit leading from the PCV valve to the downstream side or base of the carburetor. The device acts to permit improved idling characteristics and reduce fuel consumption. In a vehicle engine that pipes crankcase fumes through a PCV valve back to the intake manifold, often there is insufficient oxygen for complete combusion of the gasoline plus the unburned combustible hydrocarbons in the crankcase fumes. The device of the invention helps supply that needed oxygen and also breaks up the unburned hydrocarbons to facilitate their combustion. There are many devices which attempt to solve this problem. Such a device of this general type is disclosed in U.S. Pat. No. 3,809,035.

The prior art devices basically comprise a spring loaded ball check valve which is adapted to close when the PCV valve is closed and minimum fumes are being admitted to the intake manifold. The ball check valve opens when the PCV valve is open and increased fumes and unburned hydrocarbons are passing through the conduit to the intake manifold.

All of these prior art inventions operate by use of the vacuum system. When the vacuum system is operating effectively and efficiently, the prior art devices function adequately, but not efficiently. However, when the vacuum decreases because of engine wear or the engine becomes out of tune, the efficiency of the prior art devices is greatly affected. A further problem exists when the prior art device is used on vehicles having engines with different cubic inch displacements. Large V-8 engines tend to maintain fairly uniform vacuums, while smaller engines tend to produce less consistent vacuums. The prior art devices are designed to fit all automobiles and must have consistent uniform vacuums to function to any degree. Such is not simply the case in actuality since engine sizes vary, most are worn or are out of tune. Hence, the effectiveness of such devices are greatly reduced simply because of ununiform, inadequate vacuums.

The present invention overcomes these problems by creating a device which does not depend on the vacuum system to operate, yet provides all of the other beneficial effects of the prior art devices.

SUMMARY OF THE INVENTION

A device for controlling the fuel-air mixture of an internal combustion engine by regulating the addition of ambient air to the crankcase fumes is disclosed. The device is coupled in the vacuum system between the crankcase and carburetor. The device is comprised of a valve having a somewhat conocial seat into which a semi-spherical ball is disposed to terminate air flow through the valve. A solenoid switch is coupled to said semi-spherical ball so as to raise it from said seat upon being activated, so as to permit ambient air flow into the vacuum vent line. The solenoid is activated by a switch set to operate through a preselected RPM range.

It is, therefore, a principal object to the present invention to increase the efficiency of internal combustion engines utilizing PCV flow control valves.

It is another major object of the invention to increase the efficiency of all internal combustion engines, even those not utilizing a PCV valve.

Another object of the invention is to provide a device mountable in the conduit from the PCV valve to the air intake downstream of the carburetor venturi which will admit additional air under controlled conditions to increase combustion efficiency.

Yet, another object of the invention, is to maintain a more correct fuel to air ratio in the engine air intake manifold under varying engine load conditions.

Other objects, features and advantages of the invention will become apparent from the following description of the accompanying drawings.

BRIEF DESCRIPTION OF THE DRAWINGS

FIG. 1 is a cross-sectional view of the preferred embodiment of the present invention shown installed in a typical application, as shown the valve is closed, restricting ambient air flow into the vent vacuum system;

FIG. 2 is a cross-sectional view of the device of FIG. 1, taken along line 2—2 of FIG. 1, showing the solenoid activated to permit ambient air flow into the vacuum vent system;

FIG. 3 is an alternate embodiment of the device of the present invention shown in cross-section;

FIG. 4 is an elevation view of the preferred embodiment;

FIG. 5 is an elevation view of the alternate embodiment;

DETAILED DESCRIPTION OF THE PREFERRED EMBODIMENTS

Figure 6:
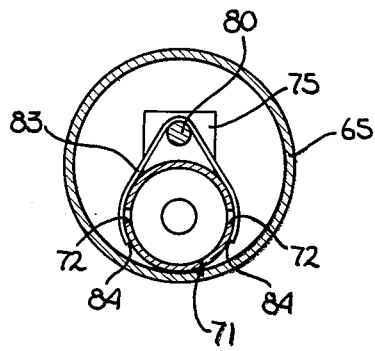
FIG. 6 is a cross-sectional view of the alternate embodiment taken along line 6.6 of FIG. 3.

Referring to the drawings and particularly to FIGS. 1, 2, and 4, the preferred embodiment of the present invention is shown. The device is adapted to be interposed in the conduit 60, leading from the conventional PCV valve, to the downstream side of the conventional automotive vehicle carburetor. Conduit 60 usually consists of a rubber hose.

The preferred form of the present invention is comprised of a housing 20, a solenoid 30, a solenoid piston 40, and a valve housing 50. Those particular items will now be described in detail following which, their individual functions and usage will be described.

The valve housing 20, is a cylinderical member having side wall 22, enclosed end 21 and open end 29. Two apertures for electrical conduits are disposed through end 21, namely apertures 23 and 24. Aperture 23 is adapted to receive electrical leads from the solenoid, while aperture 24 is adapted to receive electrical leads 27, from the solenoid to light 25. Light 25 is enclosed within the cover 26 which is coupled to wall 21. Air holes 28, are disposed around the perimeter of the housing, near lower end 29, to permit ambient air to flow into the housing. A filter 15 is shown disposed circumferentially around the housing 20, so as to cover air holes 28 and filter the air passing therethrough.

The solenoid 30, is adapted to be disposed within housing 20, such that its upper end 32, is towards end 21, of the housing. Solenoid 30, has a cylindrical bore 33 extending partially therethrough and is adapted to receive the piston 40. The open end of bore 33 is directed towards the open end 29 of housing 20. Stop ring 44 is disposed inside of housing 20, so as to provide a specified position of solenoid 30 within housing 20. In alternate embodiments, the inner portion of housing 20 may be ribbed to prevent twisting of solenoid 30.

The valve housing 40, is generally cyclindrical in shape, having an upper edge 52, and a lower edge 51. The valve housing 50, is disposed within housing 20, such that the upper edge 52 is disposed adjacent and in contact with lower edge 31, of solenoid 30. In this position, valve housing 50 may be welded or bonded to housing 20 and precise positioning of valve housing 50 and solenoid 30. In this position, the lower edge 51, of valve housing 50, is disposed at the same elevation as end 29, of housing 20. When properly disposed, as shown in FIG. 1, fusing, welding or bonding may be used around the perimeter, joining valve housing 50 and the lower edge 29, of housing 20.

The valve housing 50 has disposed therein, a valve seat 54, which is generally frusto-conical in shape. Disposed at the lower end of the seat 54, is a cylindrical cavity 55, (FIG. 2), which is adapted to receive a spring 61. A bore 56, is coupled to the cavity 55, and extends through the stem of the valve, coupling to vent line 60 at ends 57 and 58. Ends 57 and 58 are in the preferred embodiment serrated and conical and are adapted to be coupled to the vent line 60. The valve housing 50, has disposed therein, in its preferred form, a slot 59 through which ambient air may flow from the interior of the housing 20, through cavity 55 and bore 56 to vent line 60, Piston 40 is formed so as to be able to be disposed within the bore 33 of solenoid 30. In its preferred form, its lower end 43, has disposed therein, a slot 47, (FIG. 2) through which member 45 is disposed so as to be rotably coupled to piston 40. Member 45 is formed as an integral part of ball 44 and permits rotation of ball 44 as would a differential joint. Ball 44 is generally semi-spherical in shape and is adapted to be disposed within ball seat 54 of valve housing 50 (FIG. 1). When solenoid 30 is activated, piston 40 is retracted into solenoid 30, ball 44 would be disposed above seat 54 (FIG. 2), permitting ambient air flow into vent line 60.

Having now described the physical characteristics of each element of the device, their association and function will now be described. Solenoid 30 has two electrical leads 62 and 63. Lead 62 is coupled to an activating switch, while lead 63 is coupled to the positive battery terminal. The activating switch in the preferred form of the present invention, is set to activate at a no load condition when the engine reaches 2000 RPM's and above. It has been found that such an operating range is most efficient for the fuel air mixture for the carburetor. Below that range, the fuel mixture is lean and efficient. Anything at that range or above produces a too rich mixture and needs to be leaned by the addition of additional ambient air. In the preferred form therefore, solenoid 30 is activated when that particular RPM level is reached and retracts piston 40 into solenoid 30, thereby raising the spherical ball 44 from seat 54, and permitting ambient air to pass through apertures 28, slot 59 of valve housing 50, between the valve seat 54 and ball 44, through recess 55, and into bore 56, and thereby passing into the vent line 60.

In the preferred form, it has been found that a solenoid having a 100 ounce pull at 1/64 of an inch on piston 40, is efficient. Standards of the California Air Resources Board require that any addition to the vent fitting produce no more than 3 cubic feet of air per minute at 7 inches of mercury vacuum. In the preferred form, it has been discovered that a 1/64 of an inch clearance between the ball and seat will produce that flow of air.

The piston and spherical ball 44, are uniquely designed as illustrated in FIGS. 1 and 2. The connection is, in effect, a differential fitting, which permits slight misalignment between the solenoid and valve 50, but, will still permit effective sealing therebetween.

Spring 61, normally urges ball 44 into its open position, FIG. 2. The resistance to compression of spring 61 is predetermined so that it will hold constant pressure ball 44 away from seat 54 to aid in its immediate release upon activation of the solenoid. However, when the solenoid is deactivated, the vacuum will easily suck ball 44 down onto seat 54.

The device of the present invention can be easily adapted for use in vehicles not having a vent line from the crankcase to the intake manifold, by capping end 57 and coupling end 58 to the intake manifold. The device provides the additional ambient air to better regulate the fuel-air mixture in the intake manifold.

In the preferred form of the present invention, the valve housing 50 and housing 20 are formed of an acetal copolymer. It is dimensionally stable and resistant to thermal expansion and contraction. Its dimensional stability can be increased by loading the acetal copolymer with about 25 percent of glass fibers or other high temperature filler and/or strengthening material.

The ball 44, in the present invention is formed of a nylon material for efficient and effective wear. The spherical ball 44 also cooperates with the spherical seat 54 to provide a self-cleaning action, tending to displace and knock away any dirt, oil or other debris, which might otherwise keep the ball 44 from seating firmly or restricting air flow through the annular opening between the ball and housing. Ball 44 may also be formed of a polyethylene which has a relatively low coefficient of thermal expansion and which releases oils and other greases rather steadily, so as to facilitate the self-cleaning action.

The light 25, is coupled to solenoid 30, so as to be activated whenever solenoid 30 is activated. This is especially helpful during installation. It permits the installer to know when the solenoid is actually being activated and thereby permits more ease of installation. An additional benefit is that the solenoid can be checked for operation without having to disassemble the unit.

The preferred embodiment of the fuel-air control device of the present invention is adapted for efficiently supplying additional air to the crankcase ventilating fumes when the engine is under strain and the intake manifold vacuum is low, as when the engine is accelerating or operating at high speeds.

In the preferred form of the present invention, it has also been found that the device operates most effectively when set to activate at 2000 RPM's, under no load conditions. It is this level which seems to be the point where the fuel-air mixture needs to be leaned both high speed and at load stress conditions for efficient and economical operation. It may be discovered that for any particular engine, a different specific RPM may be most efficient. Therefore, the present invention provides a means for adjusting the device to fit any particular engine characteristics by simply providing a means for activating the solenoid at any particular point. Proper adjustment may be accomplished by a trained mechanic evaluating the characteristic performance of a particular engine and either raising or lowering the critical point at which the solenoid is activated.

In the preferred embodiment, a filter 15 is disposed around housing 20 over holes 28, to filter out large particulate matter which could cause the device to become jammed, non-operable, or permit particulate matter to enter the intake manifold.

The second embodiment of the fuel-air control device is illustrated primarily in FIG. 3, however, additional views are shown in FIGS. 5 and 6. The second embodiment is comprised of a housing 65, a tubular mixing member 71, a solenoid 75, and a sealing arm 83.

In this embodiment, the mixing chamber 71 is long and tubular shaped, having an end 67, and an end 68. Each end is serrated and conical and is capable of being coupled to hose 60. End 67 has an inner diameter $Id1$ and end 68 has an inner diameter $ID2$. It has been found to operate best when $Id1$ is 0.225 inches in diameter and $ID2$ is 0.180 inches in diameter. The internal mixing chamber 71 is disposed within and coupled to housing 65, such that, its ends 67 and 68 protrude therefrom. A pair of apertures 72, having a predetermined size (0.125 preferably) are disposed through the wall of chamber 71, near end 67, as illustrated in FIG. 3. Chamber 71 is coupled to housing 65, so as to be rigidly fixed thereto. Solenoid 75 is rigidly coupled to mixing chamber 71. Solenoid 75 has end 77 disposed towards end 67 of the chamber 71. A bore 76, is disposed into solenoid 75, having a back edge 79 and capable of receiving a piston 80. Piston 80 has an end 81 which is disposed into bore 76. End 82 of piston 80, extends forward of solenoid 75 and is coupled to sealing arms 83, best illustrated in FIGS. 3 and 6.

The sealing arms are generally curved so as to fit around the chamber 71, FIG. 6. Arms 83 are generally formed from stainless steel and must be precisely fit around chamber 71. A sealing lubricant is also disposed between arms 83 and chamber 72, to lubricate and seal simultaneously. A spring 87 is disposed about piston 80, so as to force piston 80 from its retracted position, position 2, into its fully extended position, position 1, FIG. 3. In position 1, the solenoid is not activated. As solenoid 75 becomes activated, piston 80 is withdrawn into bore 76 until the sealing arm 83 reaches position 2. At that point, air flow from the ambient will not be mixed in chamber 71. In this form, unlike the preferred embodiment, activation of the solenoid occurs during at no load conditions below 2000 RPM's, therefore, when the switch is activated, the solenoid is deactivated and piston 80 moves out and sealing arm moves away from aperture 72. (In this position, air from the ambient will flow into mixing chamber 71 and produce the proper air-fuel mixture).

It should be noted that while ambient air is admitted to the vent line during periods when the solenoid is not activated, the device could be made to admit air during activation.

The housing 65 of this embodiment encloses the solenoid, piston 80 and sealing arms 83. A stop 73 is disposed on the inner face of end 69 of body 65 to prevent the extension of piston 80 to any extent beyond that desired. Four apertures 92, are cut through the housing 65, as illustrated in FIG. 5, on both sides thereof. These apertures are to permit the flow of ambient air into the housing and eventually into the internal mixing chamber 71. It should be noted that in this embodiment, four apertures are used, but that in a different embodiment, more or less could be used. A filter 93 is disposed over the apertures to filter out the large particulate matter which could enter into the housing and thereby cause damage and enter vapor return line.

In this embodiment, a light 88 is also employed for the same reasons discussed in the preferred embodiment. Two electrical leads, 90 and 91, pass through housing 65; lead 91, to the positive battery and lead 90 to the switch.

The present invention has been tested. One such using a single motor home on a non-tuned engine. The following results were noted over the same course:

| Miles Traveled | Miles Per Gallon |
|---|---|
| (without device) 180.4 | 5.32 (with 6 hr. air-conditioning) |
| 293 | 5 |
| DYNO TESTED at 2500 RPM=95 H.P. | |
| (with device) 289.3 | 10.33 |
| 311 | 7.59 (with 9 Hr. air-conditioning) |
| DYNO TESTED at 2500 RPM=104 H.P. | |

As can be seen from the proceeding test results, a 51% increase occurred with air conditioning running, while a 94% increase occurred without air conditioning and showed an increase in rear brake horse power of 9.47%. The device was installed on a 29 foot Avco motor home which won the 1977 National Pismo Beach Economy Run.

The solenoid of the present invention is activated by a switch. In the preferred form, the switch is efficient and reliable, although it is understood that any other type of mechanical or electronic switch could equally well be employed with the present invention.

The switching device 150 is comprised of 3 main elements; a frame 100, a reed magnetic switch 108, and movable magnetic 116. The frame 100 is formed of a rigid bendable material such as steel and is initially straight, having a mounting aperture 102 at end 100 and a plastic or non-magnetic member 103 fixed to the opposite end 109. Coupled to non-magnetic member 103, near end 108 is the reed switch 108. (A reed switch is well known in the art and comprises a tube containing conducting, at least one reslilent member and one semi-rigid member extends from each end, preset so as to not be in contact. The members are enclosed in a plastic tube such that as a magnetic force is passed along the tube, the resilient member is attracted by the force and contacts the semi-rigid member. The resilient member is electrically coupled to one lead 105 and the semi-rigid member to the other lead 104). Lead 105 is coupled to the solenoid switch and lead 104 to ground.

Figure 7:
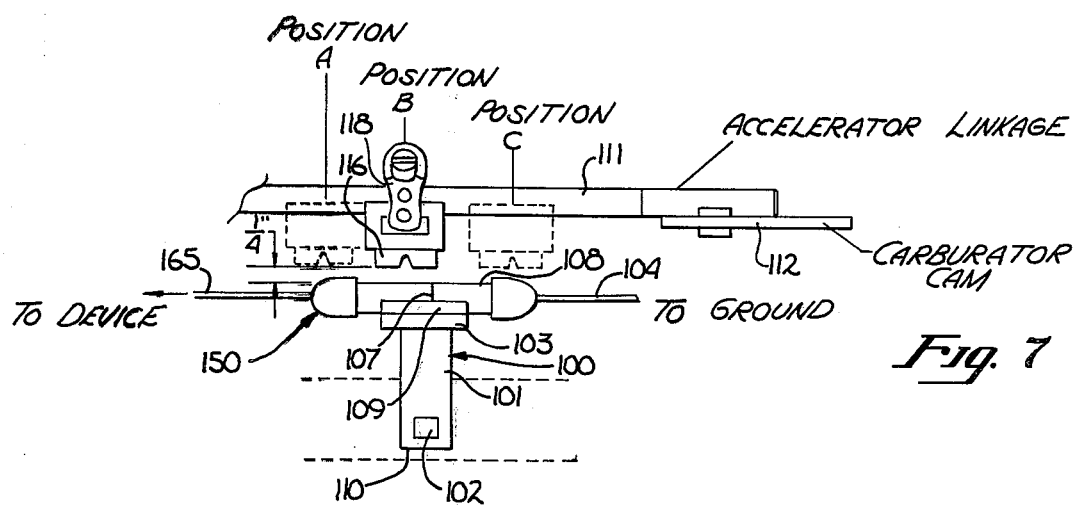
FIG. 7 is a switch for activating the solenoid at preselected RPM intervals.

Frame 100 is secured to the engine block 112 by a bolt disposed through aperture 102. The frame 100 is bent in a 90° angle so that it is juxtaposed to the accelerator linkage, as shown in FIG. 7. Magnetic 116 is clamped to the accelerator linkage, as shown in FIG. 2. Mark 107 is placed on reed switch 108 to indicate the point at which the magnetic 116 will activate the switch 108.

The magnetic 116 is precisely adjusted to the accelerator linkage 111 so that it activates the switch at 2000 RPM no load, at position B. When magnetic 116 is between position B and position A, the switch will not be activated, while between position B and position C, it will be activated. Typically, a standard circular clamp 118 is used to secure the magnetic 116 to the accelerator linkage 111. It has been found the optimum distance between magnetic 116 and switch 108 is ¼ inch.

Figure 8:
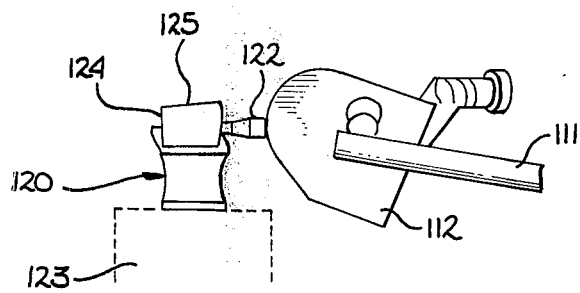
FIG. 8 is an alternate embodiment of a switching device for activating the solenoid switch of the device of the present invention.

In FIG. 8, an alternative switch is shown. There, a micro switch 120 is employed. It is disposed adjacent to the accelerator cam 112 and coupled to engine frame 123. It is set so as to be activated while at 2000 RPM idle. The switch arm 122 of switch 120 contacts accelerator cam 112 when it is rotated to the desired, preselected position. At that point, a signal is sent to activate the solenoid. In this form, lead 124 is coupled to the solenoid and lead 125 is coupled to ground.

Although the present invention has been described in connection with preferred embodiments thereof, many variations and modifications will now become apparent to those skilled in the art. It is preferred, therefore, that the present invention be limited, not by the specific disclosure herein, but only by the appended claims.

I claim:

1. A device for aiding in the control of the fuel-air mixture in an internal combustion engine having a ventilation passage from the crankcase of said engine to the intake manifold, said device comprising:
   (a) A valve housing having a seat coupled to an air passage, said air passage adapted for communication between the ambient and said ventilation passage;
   (b) a solenoid means; activated whenever the revolutions per minute of said internal combustions exceed 2000;
   (c) a valve means for seating in said seat thereby preventing ambient air from flowing into said air passage, said valve means coupled to said solenoid such that upon activation, ambient air flows into said ventilation passage.

2. The device of claim 1, wherein a spring means is disposed in said valve housing for urging said valve means from said seat with a predetermined force.

3. The device of claim 1, wherein said valve means is a semi-spherical ball coupled to a piston activated by said solenoid.

4. The semi-spherical valve means of claim 3, formed so as to be coupled by differential means to said piston so as to be pivotal and permit proper seating even when misalignment occurs between said solenoid and said valve housing.

5. The device of claim 1, wherein said solenoid means is activated by a switch means, said switch means being set to be activated whenever the load conditions of said engine exceed the conditions of said engine while at 2000 RPM under no load conditions.

6. The switch means of claim 5, comprised of; a switch activated by a magnetic force, said switch coupled to said engine and juxtaposed to the accelerator linkage, a magnetic coupled to said accelerator linkage such that it passes said switch and activates it at a predetermined engine performance level and deactivates it whenever below said predetermined level.

7. The switch means of claim 5, comprised of a micro switch disposed so as to be activated by the accelerator cam at and above said predetermined performance level and deactivates it whenever below said level.

8. The device of claim 1, wherein said solenoid means is activated by a switch means, said switch means being set to be activated whenever the load conditions of said engine exceed the conditions of said engine while at 2000 RPM under no load conditions.

9. The switch means of claim 8, comprised of; a switch activated by a magnetic force, said switch coupled to said engine and juxtaposed to the accelerator linkage, a magnetic coupled to said accelerator linkage such that it passes said switch and activates it at a predetermined engine performance level and deactivates it whenever below said predetermined level.

10. The switch means of claim 8, comprised of a micro switch disposed so as to be activated by the accelerator cam at and above said predetermined performance level and deactivates it whenever below said level.

11. The switch means of claim 9, comprised of a switch activated by a magnetic force, said switch coupled to said engine and juxtaposed to the accelerator linkage, a magnetic coupled to said accelerator linkage such that it passes said switch and activates it at a predetermined engine performance level and deactivates it whenever below said predetermined level.

12. The switch means of claim 10, comprised of a micro switch disposed so as to be activated by the accelerator cam at and above said predetermined performance level and deactivates it whenever below said level.

* * * * *